US010351712B2

(12) United States Patent
Colyar et al.

(10) Patent No.: US 10,351,712 B2
(45) Date of Patent: Jul. 16, 2019

(54) CARBON BLACK FEEDSTOCK FROM DIRECT COAL LIQUEFACTION

(71) Applicants: James J. Colyar, Newtown, PA (US); John Duddy, Langhorne, PA (US)

(72) Inventors: James J. Colyar, Newtown, PA (US); John Duddy, Langhorne, PA (US)

(73) Assignee: Axens, Rueil-Malmaison (FR)

( * ) Notice: Subject to any disclaimer, the term of this patent is extended or adjusted under 35 U.S.C. 154(b) by 0 days.

(21) Appl. No.: 15/142,198

(22) Filed: Apr. 29, 2016

(65) Prior Publication Data
US 2017/0313886 A1    Nov. 2, 2017

(51) Int. Cl.
  *C09C 1/48*    (2006.01)
(52) U.S. Cl.
  CPC ........................ *C09C 1/48* (2013.01)
(58) Field of Classification Search
  None
  See application file for complete search history.

(56) References Cited

U.S. PATENT DOCUMENTS

| 2,516,134 | A | * | 7/1950 | Molique | C09C 1/50 208/73 |
| 2,794,710 | A | * | 6/1957 | Lawson | C09C 1/50 208/47 |
| 3,247,096 | A | * | 4/1966 | Conwell | C10G 11/00 208/113 |
| 3,361,655 | A | * | 1/1968 | Robertson | C09C 1/50 208/100 |
| 3,681,231 | A | * | 8/1972 | Alpert et al. | C10G 49/12 208/108 |
| 4,094,746 | A | | 6/1978 | Masciantonio | |
| 4,364,817 | A | * | 12/1982 | Anderson | C10G 1/008 208/401 |
| 9,399,742 | B2 | * | 7/2016 | Qafisheh | C10G 55/06 |
| 2007/0144944 | A1 | * | 6/2007 | Del Bianco | C10G 1/002 208/435 |
| 2014/0209513 | A1 | * | 7/2014 | Hassan | F17D 1/00 208/419 |

* cited by examiner

*Primary Examiner* — Prem C Singh
*Assistant Examiner* — Ming Cheung Po

(57) ABSTRACT

The invention described herein relates to a novel process to create carbon black feed stocks derived from coal by utilizing direct coal liquefaction resulting in an economic process for producing carbon black feedstock. Moreover, relative to the current state of the art (use of FCC slurry oil), the invention process will be significantly more profitable when oil prices increase.

7 Claims, 2 Drawing Sheets

CARBON BLACK FEEDSTOCK FROM DIRECT COAL LIQUEFACTION

FIELD OF THE INVENTION

Carbon blacks are widely utilized, for example, as pigments in ink compositions, paints and the like, as fillers and reinforcing pigments in the compounding and preparation of rubber compositions and plastic compositions, and for a variety of other applications. Carbon blacks are generally produced in a furnace-type reactor by reacting a hydrocarbon feedstock with hot combustion gases to produce incomplete combustion products containing particulate carbon black. Carbon black feedstocks include coal tar oils, FCC slurry oil and the aromatic residue from steam cracking of naphtha/gas oil. In the United States, nearly all carbon black feedstocks are petroleum derived and are chiefly comprised of the heavy slurry oil from refinery FCC Units. The invention described herein provides a unique method for producing carbon black feedstock from a coal direct liquefaction process. Since the historical cost of coal is fairly constant, the use of direct coal liquefaction for producing carbon black feedstock will have commercial advantages at higher oil prices.

BACKGROUND OF THE INVENTION

The two primary approaches for coal refining for the purpose of converting coal to liquids are called direct and indirect coal liquefaction. Direct coal liquefaction (DCL) reacts coal in a solvent with hydrogen at high temperature and pressure to produce liquids. DCL was first developed in Germany in 1913 and used commercially in Germany between 1927 and 1945. However, after World War II, crude oil was widely available at reasonable prices and the implementation of coal liquefaction was therefore not commercially attractive. As a result, only a small quantity of liquid fuels sold today is produced using a direct coal liquefaction process.

An important DCL technology is the H-Coal Process which was invented by Hydrocarbon Research, Inc. and is generally described in U.S. Pat. Nos. 3,519,553 and 3,791,959. The H-Coal Process uses a single ebullated-bed reactor with a hydroconversion catalyst to convert coal to liquid fuels. The ebullated-bed reactor is unique in its ability to process solids containing streams in the presence of high activity hydrogenation catalyst particles. Product oil (400° F.$^+$) was used to slurry the coal for feeding to the reactor. Coal liquefaction took place at temperatures of 800-875° F., and hydrogen partial pressures of 1500-2500 psia. With Illinois No. 6 coal, liquid yields of greater than 50 w % on DAF coal were achieved during the multi-year demonstration program at the 200 ton per day H-Coal Pilot Plant in Catlettsburg, Ky. The H-Coal DCL Technologies demonstrated commercial readiness, however, no commercial projects proceeded as oil prices fell and oil supplies increased.

In the 1980's and 1990's research continued at a smaller scale to improve the DCL technologies and reduce investments and operating costs. The Catalytic Two-Stage Liquefaction Process (H-Coal $_{TS}$) was invented by Hydrocarbon Research, Inc., as described in U.S. Pat. Nos. 4,842,719, 4,874,506, and 4,879,021, to substantially increase the yield of distillate liquids from coal. For Illinois No. 6 bituminous coal, liquid yields were increased from 3 barrels per ton of DAF coal for the single stage H-Coal Process to about 5 barrels per ton of DAF coal for the H-Coal $_{TS}$ Process. This was achieved by dissolving the coal feed at mild conditions while simultaneously hydrogenating the coal recycle solvent and coal liquids produced at temperatures from 600-800° F., hydrogen partial pressures of 1500-2500 psia in the presence of a hydrogenation catalyst.

In the H-Coal $_{TS}$ Process, the unreacted coal from the initial stage is then fed to a direct-coupled second stage reactor operating at higher temperatures of approximately 800-850° F. and at similar pressures (1500-2500 psia) with a hydroconversion catalyst, to achieve maximum coal conversion and high distillate liquid yields.

The direct liquefaction of coal, both in thermal and catalytic reactor systems, has been demonstrated to result in a low selectivity to VGO range product which is the desired boiling range product for a carbon black feedstock. However, it was discovered that the low DCL net selectivity of the VGO range product is a direct result of the large recycle of the VGO back to the liquefaction reactors and its subsequent conversion to lighter boiling range products.

In fact, Applicant has determined that the inherent selectivity of the coal conversion to VGO liquid is high and in the range of 40 to 50% of the total liquid produced when the recycle of VGO is omitted. A recycle of oil or feeding of externally derived oil is required to produce a coal/oil feedstock slurry which is suitable feedstock for the liquefaction reactors. Although a VGO boiling range material has traditionally been used for this recycle slurry oil and may be a preferred fraction, other boiling range materials can also be utilized. Therefore, applicants have discovered that the direct coal liquefaction process can be readily applied to the production of carbon black feedstock, wherein the recycle of heavy VGO boiling range material is replaced with a recycle of lighter material, preferable heavy atmospheric gas oil (endpoint of 600 to 700° F.) from the liquefaction product atmospheric still.

Additionally, carbon black feedstocks are required to be highly aromatic with a low API gravity. Moreover, the VGO derived from the modified coal liquefaction described above is not normally sufficiently dense and hydrogen deficient to meet carbon black feedstock specifications. However, as described herein, by adjusting of the level of catalytic activity in the liquefaction reactors, the required carbon black feedstock VGO product quality can be attained. The reduction in catalytic activity is achieved by adjustments to the level of hydrogen partial pressure and the amount of catalyst daily replacement to the ebullated-bed reactors.

This completely modified coal liquefaction process thus produces a large yield of VGO product meeting typical carbon black feedstock specifications. These specifications include a distillate boiling range of 650-1000° F., an API gravity of 0 to −5°, and an atomic hydrogen to carbon ratio of approximately 1.0. Relative to typical coal liquefaction, the process chemical hydrogen consumption is lower due to the heavy net yield slate and the reduction in catalytic activity. Additionally, Applicant's invention results in a large economic benefit in part because it results in the coproduction of valuable distillates in the naphtha and diesel boiling range.

The current invention therefore results in an innovative economic process for producing carbon black feedstock. Relative to the current state of the art in the U.S. (use of FCC slurry oil), the invention process will be significantly more profitable when oil prices are increased. This is partly a result, as mentioned above, of the coproduction of valuable naphtha and diesel fuels and the use of feedstocks (coal and natural gas for hydrogen production) which are inelastic to the price of oil. Applicant's process results in a carbon black feedstock cost which is nearly constant since coat prices are fairly constant. This can be compared to the current U.S. primary carbon black feedstock source/price which are based on the increasing and volatile light oil price.

SUMMARY OF THE INVENTION

Applicants describe a new invention to utilize a direct coal liquefaction process for the production of carbon black feedstock wherein the typical recycle of VGO in the direct coal liquefaction process is replaced with a recycle of lighter material, preferably heavy atmospheric gas oil (endpoint of 600 to 700° F.) from the liquefaction product atmospheric still. Moreover, since carbon black feedstocks are required to be highly aromatic with a low API gravity, the hydrogen partial pressure and amounts of catalyst added to the liquefaction reactors were modified in such a manner as to optimize the level of catalytic activity in the liquefaction reactors. The lower level of catalytic activity is achieved by reducing the hydrogen partial pressure (i.e., via lower total pressure or lower gas rate) and by reducing the catalyst inventory and daily catalyst replacement rate. The completely modified coal liquefaction process thus produces a large yield of VGO product meeting typical carbon black feedstock specifications. Relative to the typical direct coal liquefaction process, the chemical hydrogen consumption is lower due to the heavy net yield slate and the reduction in catalytic activity.

Because of the increased selectivity to low-hydrogen containing VGO product, the quantity of hydrogen consumed in the invention coal liquefaction process is significantly reduced. This results in improved economics due to lower operating costs and since the coal liquefaction reactors are normally gas feedrate limited, a higher coal feedrate per reactor train.

Due to the use of low-cost coal and natural gas feedstocks (used for hydrogen production) and the production of significant quantities of valuable naphtha and diesel fuels, the invention results in economics for carbon black feedstock production which is further enhanced as the price of oil increases. This is contrary to current carbon black feedstock sources/prices which are based on the increasing and volatile light oil price.

More precisely, the invention concerns a process for producing a carbon black feedstock from a direct coal liquefaction process, comprising:

a) feeding a first feed of coal, recycle slurry oil and hydrogen under liquefaction conditions to one or more liquefaction reactors to create a liquid product stream;

b) feeding said liquid products stream to an atmospheric fractionator to create a naphtha stream, a diesel stream, a heavy atmospheric gas oil stream, and an atmospheric still bottoms stream, wherein said heavy atmospheric gas oil stream is thereafter recycled back to said one or more liquefaction reactors;

c) processing said atmospheric still bottoms stream in a vacuum fractionator to create a light vacuum gas oil (LVGO) stream, a heavy vacuum gas oil stream (HVGO) stream, and a vacuum still bottoms stream, said vacuum still bottoms stream comprising vacuum residue and unconverted coal/ash; and d) utilizing said light vacuum gas oil (LVGO) stream and said heavy vacuum gas oil stream (HVGO) as the net carbon black feedstock product.

DETAILED DESCRIPTION OF THE INVENTION

Figure 1:
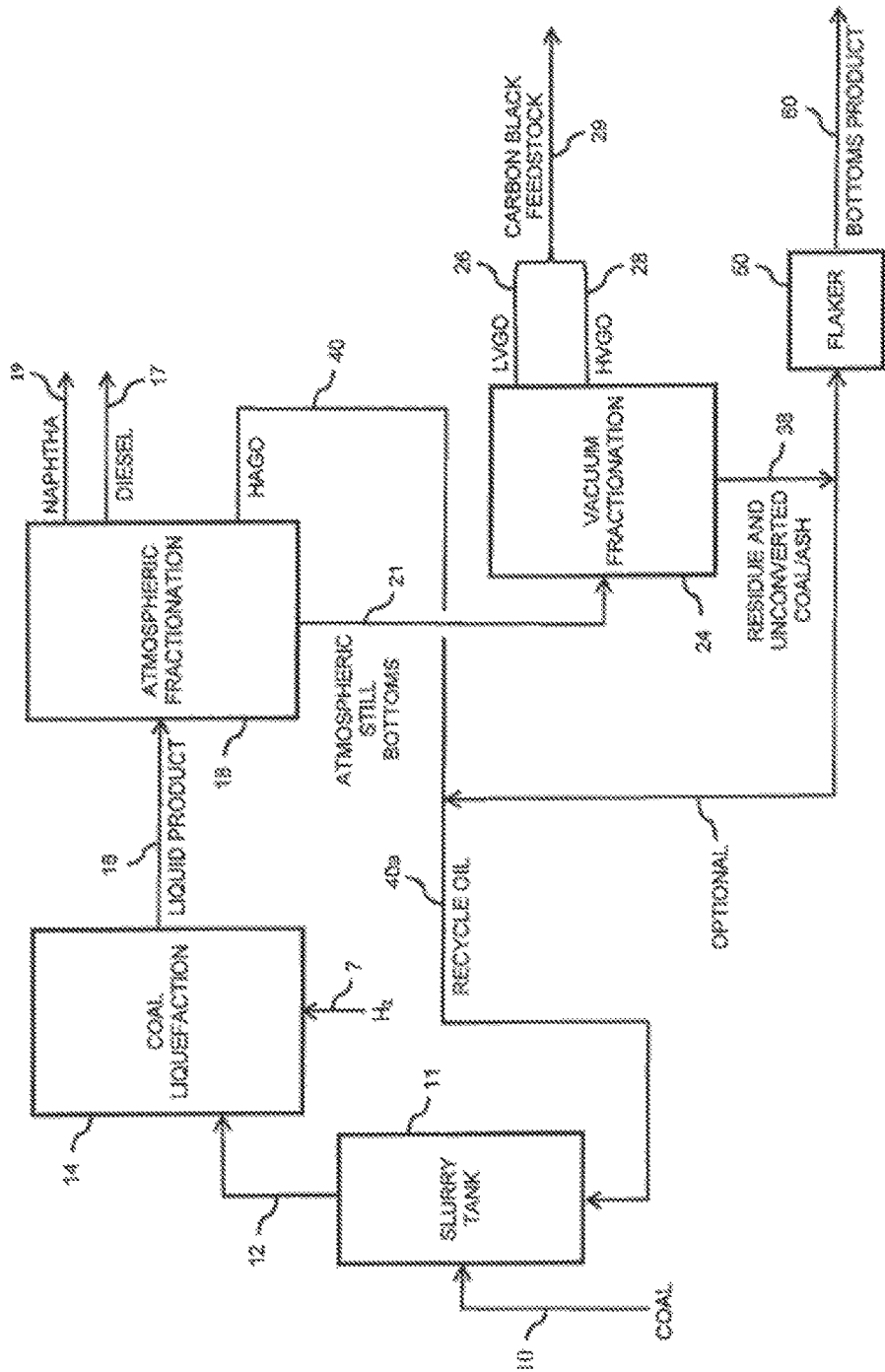
FIG. 1 shows a schematic of a coal liquefaction facility using Applicant's process for creating a carbon black feedstock.

In FIG. 1, coal 10 is sent to the coal slurry tank 11 along with recycle oil 40a from the atmospheric fractionation still 18. The recycle oil 40a may also include a vacuum residue and unconverted coal/ash stream 38 from the downstream vacuum fractionation still 24. The slurried coal and recycle oil stream 12 from the coal slurry tank 11 is subsequently sent to the coal liquefaction complex 14 along with hydrogen 7.

The coal liquefaction complex 14, which includes one or several coal liquefaction reactors operating at high temperature and pressure, creates both gases and liquid products which are routed to downstream purification and separation. The liquid stream 16 is thereafter sent to an atmospheric fractionator 18.

The atmospheric fractionator 18 separates the liquid stream 16 into a naphtha stream 19, a diesel stream 17, a heavy atmospheric gas recycle oil stream 40 (for example 600 F.°-700 F.°), and an atmospheric still bottoms stream 21. The coproduction of the naphtha stream 19 and diesel stream 17 is a key element of the invention as it provides a large economic benefit in the production of carbon black.

The heavy atmospheric gas oil stream 40 is thereafter optionally combined with a downstream vacuum residue and a portion of the unconverted coal/ash stream 38 from the vacuum fractionator 24 to create a recycle stream 40a and thereafter sent back to the slurry tank 11 to prepare the coal for liquefaction. This recovered stream 40a is a critical feature of Applicant's invention because it replaces the typical VGO recycle slurry stream and allows for the heavier VGO product to be preserved (not recycled/converted) and result in a maximum yield of carbon black feedstock.

The atmospheric still bottoms stream 21 is sent to the vacuum fractionator 24 where it is separated into a light vacuum gas oil (LVGO) stream 26, a heavy vacuum gas oil stream (HVGO) stream 28, and a vacuum still bottoms stream 38 comprising vacuum residue and unconverted coal/ash. As mentioned previously, some of the vacuum still bottoms stream 38 is thereafter optionally combined with the heavy atmospheric gas oil stream 40 to create a recycle stream 40a which is fed back to the slurry tank 11. The remaining portion of the vacuum still bottoms stream 38 is fed to a flaker 50 which creates a bottoms product stream 60.

The LVGO stream 26 and HVGO stream 28 from the vacuum fractionator 24 are combined as feedstock to produce carbon black 29. In a preferred embodiment the selectivity of carbon black feedstock products 29 is greater than forty percent (40%) of the total of naphtha stream 19, diesel stream 17, LVGO stream 26 and HVGO stream 28.

Product stream 29 will be meet the required carbon black specifications through selection of the ebullated-bed hydrogen partial pressure level and the catalyst inventory and daily replacement ratio. The critical carbon black feedstock inspections are the API gravity (<0°), the distillation end point <1000° F.) and an atomic hydrogen to carbon ratio of 0.98 to 1.02.

Because of the enhanced selectivity to low-hydrogen containing VGO product, the quantity of hydrogen consumed in the invention coal liquefaction process is significantly reduced relative to the typical DCL Process. This results in improved economics due to lower operating costs and since the coal liquefaction reactors are gas feedrate limited, a higher coal feedrate per reactor train.

Due to the use of low-cost coal and natural gas feedstocks and the production of significant quantities of valuable naphtha and diesel fuels, the invention results in economics for carbon black feedstock production which are enhanced as the price of oil increases. This is directly opposite to the current carbon black feedstock source/price which are based on the increasing and volatile light oil price.

This invention will be further described by the following example cases, which should not be construed as limiting the scope of the invention.

EXAMPLE

A modified DCL facility was designed and economics developed for the production of a carbon black feedstock meeting specifications. The modified DCL Plant operating processes 10,000 STPD (dry basis) of a U.S. bituminous coal. DCL Plant operating conditions relative to the typical DCL conditions are shown in Table 1 below:

TABLE 1

|  | Typical DCL-VGO Recycle | Modified DCL-Carbon Black Feedstock Production |
| --- | --- | --- |
| Feedrate, STPD (MF) | 10,000 | 10,000 |
| Number of Reactor Stages | 2 | 2 |
| Reactor Temperature | T | T |
| Reactor Pressure | P | 0.8 P |
| Catalyst Replacement Rate | C | 0.3 C |

The yields and product qualifiers from the modified DCL Plant are based on many years of pilot plant and commercial operation and are summarized in Table 2 below:

TABLE 2

| Yields, w % of Moisture and Ash Free (MAF) Coal | |
| --- | --- |
| Gases | 17.2 |
| Naphtha | 15.6 |
| Diesel | 13.7 |
| VGO (Carbon Black Feedstock) | 29.1 |
| Unconverted Coal/Heavy Oil | 29.1 |
| Total C5 to 1000° F. liquids (Naphtha, Diesel, VGO) | 58.4 |
| Hydrogen Consumption, w % | 4.7 |
| Selectivity of liquids to carbon black feedstock | 49.8% |
| Carbon Black Feedstock (Inspections) | |
| Boiling Range, ° F. | 700-1000 |
| Gravity, °API | 0.1 |
| Atomic Hydrogen/Carbon Ratio | 1.0 |

Figure 2:
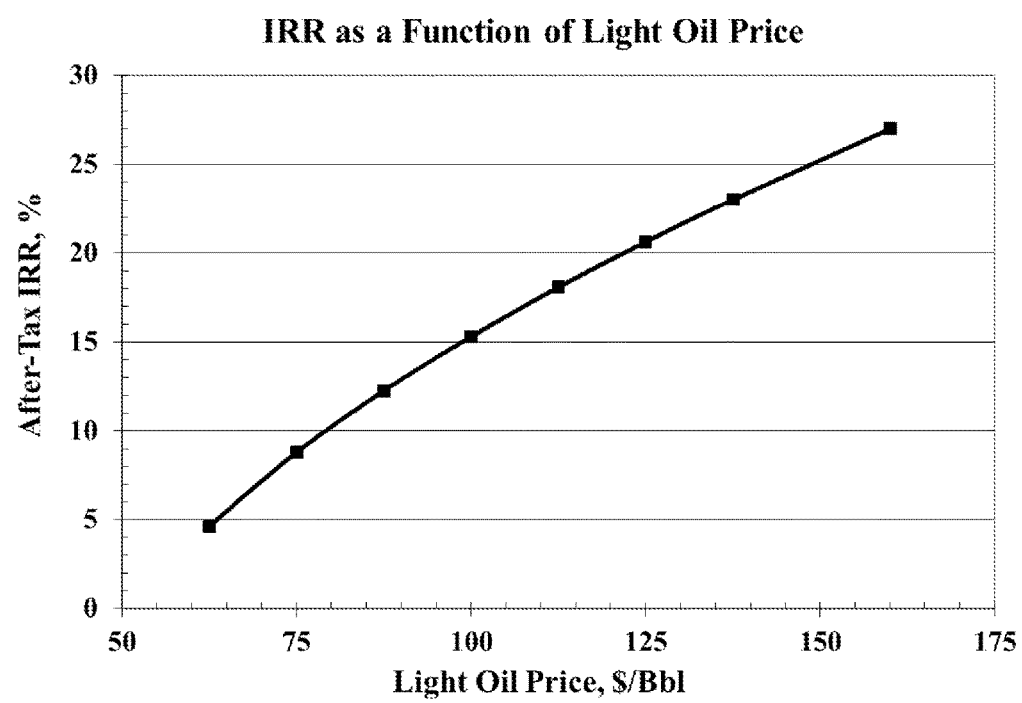

The modified facility will produce approximately 29 w % of carbon black feedstock meeting the required specifications. The process therefore has a high (49.8%) selectivity of carbon black feedstock production relative to total liquids ($C_5$ to 1000° F.). Without the process modifications, the yield of VGO (carbon black feedstock) would be less than 10 w %. Realistic economics of the modified DCL Plant were developed (investment, operating cost, profitability) and evidence a high and increasing IRR (internal rate of return) as the light oil price increases. A break even light oil value at approximately $50/Bbl is indicated. This is shown in FIG. 2.

The invention described herein has been disclosed in terms of specific embodiments and applications. However, these details are not meant to be limiting and other embodiments, in light of this teaching, would be obvious to persons skilled in the art. Accordingly, it is to be understood that the drawings and descriptions are illustrative of the principles of the invention, and should not be construed to limit the scope thereof.

We claim:

1. A process for producing carbon black feedstock from a direct coal liquefaction process, comprising:
    a) feeding a first feed of coal heavy atmospheric gas oil from step b) to slurry said coal along with hydrogen under liquefaction conditions to one or more liquefaction reactors to create a liquid product stream;
    b) feeding said liquid products stream to an atmospheric fractionator to create a naphtha stream, a diesel stream, a heavy atmospheric gas oil stream, and an atmospheric still bottoms stream, wherein said heavy atmospheric gas oil stream is recycled back to said one or more liquefaction reactors;
    c) processing said atmospheric still bottoms stream in a vacuum fractionator to create a light vacuum gas oil (LVGO) stream, a heavy vacuum gas oil stream (HVGO), and a vacuum still bottoms stream, said vacuum still bottoms stream comprising vacuum residue and unconverted coal/ash;
    d) combining said light vacuum gas oil (LVGO) stream and said heavy vacuum gas oil stream (HVGO) to provide a net carbon black feedstock product wherein the selectivity of said net carbon black feedstock product is greater than fob percent of the total of said naptha stream and diesel stream from step b and said light vacuum gas oil (LVGO) stream and said heavy vacuum gas oil (HVGO) stream from step c); and
    e) processing said net carbon feedstock product to produce a carbon black.

2. The process of claim 1 wherein there is one liquefaction reactor in step a).

3. The process of claim 1 wherein there are two or more liquefaction reactors in step a).

4. The process of claim 1 wherein the net carbon black feedstock products in step d) has a gravity of less than 1° API.

5. The process of claim 1 wherein the net carbon black feedstock products in step d) has a gravity of less than 0° API.

6. The process of claim 1 wherein the net carbon black feedstock products in step d) has an atomic hydrogen to carbon ratio of 0.98 to 1.02.

7. The process of claim 1 wherein the net carbon black feedstock products in step d) has a distillation end point of less than 1000° F.

* * * * *